(12) United States Patent
Sheppard

(10) Patent No.: US 7,975,046 B2
(45) Date of Patent: Jul. 5, 2011

(54) VERIFYING A LAWFUL INTERCEPTION SYSTEM

(75) Inventor: Scott Sheppard, Decatur, GA (US)

(73) Assignee: AT&T Intellectual Property I, LLP, Atlanta, GA (US)

( * ) Notice: Subject to any disclaimer, the term of this patent is extended or adjusted under 35 U.S.C. 154(b) by 358 days.

(21) Appl. No.: 12/062,206

(22) Filed: Apr. 3, 2008

(65) Prior Publication Data

US 2009/0254651 A1 Oct. 8, 2009

(51) Int. Cl.
*G06F 15/173* (2006.01)
*G06F 17/00* (2006.01)
*H04L 29/06* (2006.01)

(52) U.S. Cl. .......................... 709/224; 726/1

(58) Field of Classification Search .................. 709/220, 709/201, 219, 217, 218, 249, 238, 232, 224–226; 715/733, 736, 737, 747; 370/392.24–259; 455/415; 726/1
See application file for complete search history.

(56) References Cited

U.S. PATENT DOCUMENTS

| | | | |
|---|---|---|---|
| 5,923,744 A * | 7/1999 | Cheng | |
| 6,463,474 B1 | 10/2002 | Fuh et al. | |
| 7,302,702 B2 * | 11/2007 | Hippelainen | 726/13 |
| 7,307,999 B1 * | 12/2007 | Donaghey | |
| 7,310,331 B2 * | 12/2007 | Sjoblom | 370/353 |
| 7,324,499 B1 | 1/2008 | Borella et al. | |
| 7,483,379 B2 * | 1/2009 | Kan et al. | |
| 7,606,160 B2 * | 10/2009 | Klinker et al. | |
| 7,730,521 B1 * | 6/2010 | Thesayi et al. | |
| 7,764,768 B2 * | 7/2010 | Davis et al. | |
| 7,809,827 B1 * | 10/2010 | Apte et al. | |
| 2002/0065938 A1 | 5/2002 | Jungck et al. | |
| 2003/0133443 A1 | 7/2003 | Klinker et al. | |
| 2006/0288032 A1 | 12/2006 | Harris et al. | |
| 2007/0081471 A1 * | 4/2007 | Talley et al. | 370/252 |
| 2007/0292079 A1 | 12/2007 | Jones | |
| 2008/0095148 A1 | 4/2008 | Hegde | |
| 2008/0127335 A1 | 5/2008 | Khan et al. | |
| 2008/0232269 A1 | 9/2008 | Tatman et al. | |

(Continued)

OTHER PUBLICATIONS

U.S. Official Action dated Nov. 20, 2009 in U.S. Appl. No. 12/062,208.

(Continued)

*Primary Examiner* — Joseph E Avellino
*Assistant Examiner* — Mark O Afolabi
(74) *Attorney, Agent, or Firm* — Hope Baldauff Hartman, LLC

(57) ABSTRACT

Methods, systems, and computer-readable media provide for verifying a lawful interception system. A first file and a second file are received. The first file is formed by recording data traffic at a computer as the data traffic generated at the computer is transmitted from the computer to a remote network via a broadband remote access server (BRAS), saving the recorded data traffic as a first packet capture and flat file export (PCAP) file, and exporting packet summary lines from the first PCAP file. The second file is formed by intercepting the data traffic as the data traffic egresses from a mediation system to a law enforcement agency (LEA) system, saving the intercepted data traffic as a second PCAP file, and exporting packet summary lines from the second PCAP file. The first file is compared with the second file to verify an accuracy of the mediation system.

12 Claims, 8 Drawing Sheets

U.S. PATENT DOCUMENTS

| | | | |
|---|---|---|---|
| 2008/0276294 A1* | 11/2008 | Brady | 726/1 |
| 2008/0317019 A1 | 12/2008 | Popoviciu et al. | |
| 2009/0007263 A1 | 1/2009 | Frenkel et al. | |
| 2009/0019220 A1 | 1/2009 | Davis | |
| 2009/0041011 A1 | 2/2009 | Sheppard | |
| 2009/0100040 A1 | 4/2009 | Sheppard et al. | |
| 2009/0254650 A1 | 10/2009 | Sheppard | |
| 2010/0086119 A1 | 4/2010 | De Luca et al. | |

OTHER PUBLICATIONS

U.S. Official Action dated May 26, 2010 in U.S. Appl. No. 12/062,193.

U.S. Official Action dated Nov. 15, 2010 in U.S. Appl. No. 12/062,193.

U.S. Official Action dated Mar. 14, 2011 in U.S. Appl. No. 12/062,226.

* cited by examiner

VERIFYING A LAWFUL INTERCEPTION SYSTEM

BACKGROUND

This invention relates to interception of traffic, in particular lawful interception of broadband traffic.

Lawful interception (e.g., wiretapping) is a common technique used by law enforcement agencies ("LEAs") to intercept certain communications between parties of interest. Unlike illegal interception, lawful interception is performed in accordance with applicable (e.g., local, state and/or federal) laws. In particular, the communications that are intercepted under lawful interception may be subject to the limitations of due process and other legal considerations (e.g., Fourth Amendment). To further protect the parties of interest, intercepted communications may be authenticated to validate any claims in favor of or against the evidence (e.g., that the intercepted communication originated from a particular party, that the communication was intercepted at a particular time, etc.).

Lawful interception is usually accomplished with the help and cooperation of a service provider. The duty of the service provider to provide LEAs with access to otherwise private communications is governed by the Communications Assistance for Law Enforcement Act ("CALEA"). As first passed by Congress in 1994, CALEA was primarily concerned with voice communications, such as plain old telephone service ("POTS") and, more recently, voice over Internet protocol ("VOIP"). However, with the growth of the Internet, LEAs have also sought to intercept data communications transmitted over broadband networks. To this end, CALEA was recently expanded to cover data communications in addition to the traditional voice communications.

Lawful interception of voice communications is generally well known. However, conventional techniques for intercepting voice communications may not be applicable to data communications due, at least in part, to the nature of data communications and its transmission over broadband networks. For example, while access to voice communications remains mostly static (e.g., the location of a landline phone, and in many cases, a VoIP phone, generally does not change), access to the Internet is often dynamic, as evidenced by the increasing availability of Wi-Fi hotspots at airports, coffee shops, and the like. Among other things, these publicly accessible hotspots increase the difficulty of intercepting broadband communications and associating the intercepted traffic to specific users.

SUMMARY

Embodiments of the disclosure presented herein include methods, systems, and computer-readable media for verifying a lawful interception system. According to one aspect, a method for verifying a lawful interception system is provided. According to the method, a first file and a second file are received. The first file is formed by recording data traffic at a computer as the data traffic generated at the computer is transmitted from the computer to a remote network via a broadband remote access server (BRAS), saving the recorded data traffic as a first packet capture and flat file export (PCAP) file, and exporting packet summary lines from the first PCAP file. The second file is formed by intercepting the data traffic as the data traffic egresses from a mediation system to a law enforcement agency (LEA) system, saving the intercepted data traffic as a second PCAP file, and exporting packet summary lines from the second PCAP file. The first file is compared with the second file to verify an accuracy of the mediation system.

According to another aspect, a system for verifying a lawful interception system is provided. The system includes a memory for storing a program containing code for verifying a lawful interception system, and a processor functionally coupled to the memory. The processor is responsive to computer-executable instructions contained in the program and operative to: receive a first file, receive a second file, and compare the first file with the second file to verify an accuracy of the mediation system. The first file is formed by recording data traffic at a computer as the data traffic generated at the computer is transmitted from the computer to a remote network via a broadband remote access server (BRAS), saving the recorded data traffic as a first packet capture and flat file export (PCAP) file, and exporting packet summary lines from the first PCAP file. The second file is formed by intercepting the data traffic as the data traffic egresses from a mediation system to a law enforcement agency (LEA) system, saving the intercepted data traffic as a second PCAP file, and exporting packet summary lines from the second PCAP file.

According to yet another aspect, a computer-readable medium having instructions stored thereon for execution by a processor to perform a method for verifying a lawful interception system is provided. According to the method, a first file and a second file are received. The first file is formed by recording data traffic at a computer as the data traffic generated at the computer is transmitted from the computer to a remote network via a broadband remote access server (BRAS), saving the recorded data traffic as a first packet capture and flat file export (PCAP) file, and exporting packet summary lines from the first PCAP file. The second file is formed by intercepting the data traffic as the data traffic egresses from a mediation system to a law enforcement agency (LEA) system, saving the intercepted data traffic as a second PCAP file, and exporting packet summary lines from the second PCAP file. The first file is compared with the second file to verify an accuracy of the mediation system.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for verifying a lawful interception system. In the following detailed description, references are made to the accompanying drawings that form a part hereof, and which are shown by way of illustration through specific embodiments or examples.

Lawfully intercepted data traffic between a monitored computer and the Internet can be a tremendous source of evidence for law enforcement agencies. The successful utilization of the intercepted data traffic in a court of law depends in large part on the accuracy and timeliness of a mediation system adapted to intercept the data traffic. In particular, it is important under the Communications Assistance for Law Enforcement Act ("CALEA") that the intercepted data traffic matches the actual data traffic transmitted between the monitored computer and the Internet.

Embodiments described herein provide for the verification of intercepted data traffic by a mediation system. In particular, the data traffic intercepted by the mediation system is compared with the actual data traffic transmitted between a monitored computer and the Internet. If all of the actual data traffic is captured by the mediation system, then the mediation system is properly operating. If all of the actual data traffic is not captured by the mediation system, then the mediation system is not properly operating. According to further embodiments, the relative time (hereinafter referred to as the capture time) for the mediation system to intercept the data traffic is also calculated.

Figure 1:
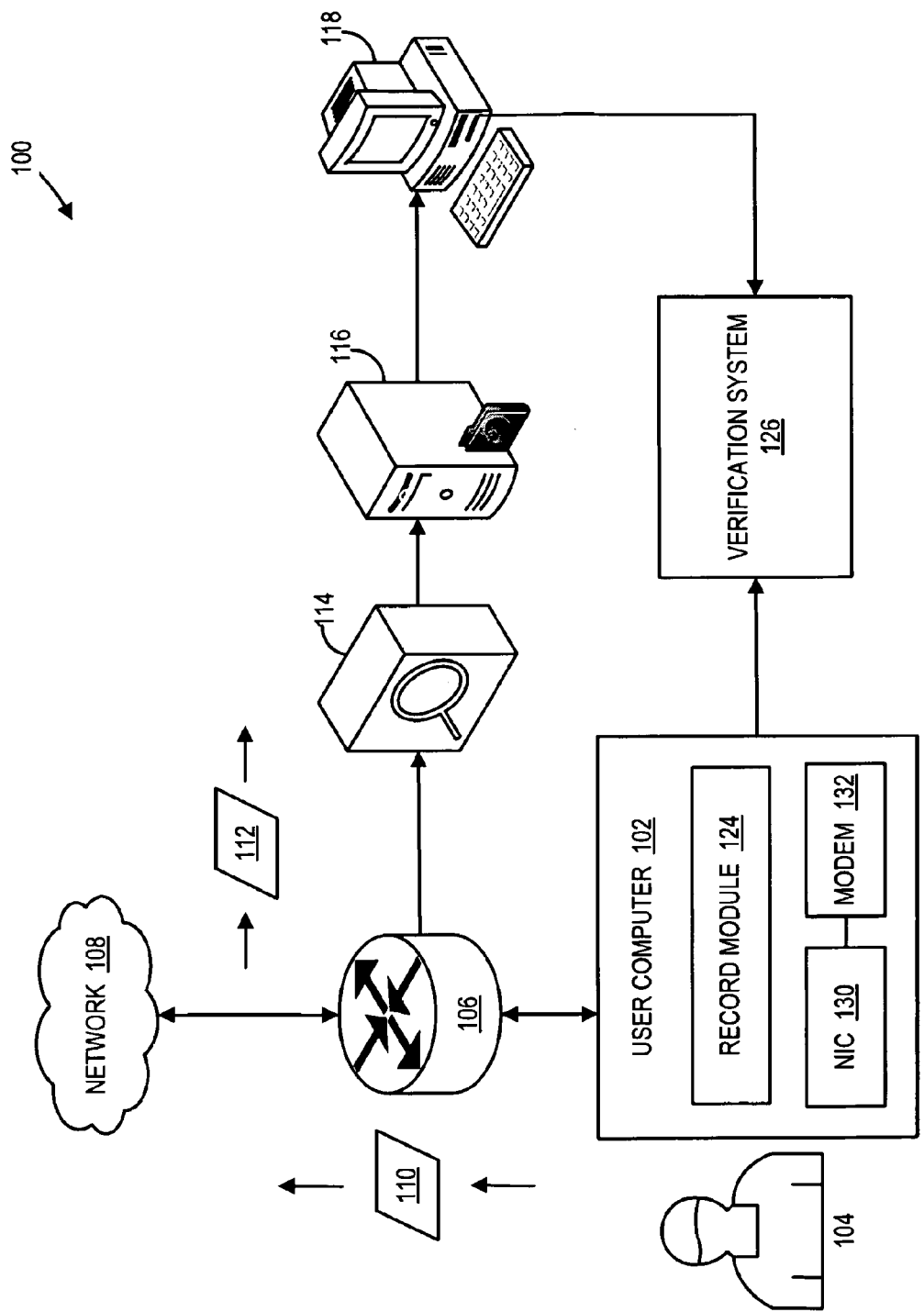
FIG. 1 is a simplified block diagram illustrating a testing system for verifying a lawful interception system, in accordance with exemplary embodiments.

Referring now to the drawings, it is to be understood that like numerals represent like elements through the several figures, and that not all components and/or steps described and illustrated with reference to the figures are required for all embodiments. FIG. 1 is a simplified block diagram illustrating a testing system 100 for verifying the accuracy of a mediation system 116, in accordance with exemplary embodiments. The testing system 100 includes a user computer 102 operated by a user 104. The user computer 102 is operatively coupled to a broadband remote access server ("BRAS") 106, which provides access to a network 108, such as the Internet. More specifically, the BRAS 106 is operatively coupled to a modem 132, which is operatively coupled to a network interface card ("NIC") 130 in the user computer 102. The user computer 102 transmits data traffic to and receives data traffic from the network 108 via the BRAS 106. In a further embodiment, the BRAS 106 may route data traffic to and from multiple digital subscriber line access multiplexers ("DSLAMs") (not shown) to the network 108. The BRAS 106 may also support the authentication and termination of point-to-point protocol ("PPP") connections originating at the user computer 102 via, for example, a suitable accounting, authentication, and authorization ("AAA") protocol. An example of the BRAS 106 is a NORTEL SERVICES EDGE ROUTER 5500 (also known as a "SHASTA"). An example of the modem 132 is an asymmetric digital subscriber line termination unit remote ("ATUR").

As illustrated in FIG. 1, test traffic 110 is transmitted from the user computer 102 to the network 108 via the BRAS 106. The test traffic 110 may be manually generated by the user 104. Alternatively, the test traffic 110 may be automatically generated by any suitable network traffic generator, such as the IXIA CHARIOT from IXIA CORPORATION or from SAA/IP SLA functions found in many routers from CISCO SYSTEMS INC. According to exemplary embodiments, the test traffic 110 is recorded by a record module 124, which is adapted to record all data traffic originating from the user computer 102. Examples of the record module 124 include, but are not limited to, ETHEREAL from ETHEREAL, INC. and WIRESHARK from GERALD COMBS.

According to exemplary embodiments, the BRAS 106 makes a copy 112 of the test traffic 110, which is detected and intercepted by the mediation system 116 via a probe 114. In one embodiment, the probe 114 is a sniffer, which is a device that can be adapted to capture data traffic of interest. An example of a sniffer is the AGILENT J6800A NETWORK ANALYZER. In other embodiments, the copy 112 of the test traffic 110 can also be sent via user datagram protocol ("UDP") or other suitable protocol from the BRAS 106 or a suitable router directly to the mediation system 116.

In one embodiment, the copy 112 also includes AAA metadata (e.g., login information), which may associate the copy 112 to the user 104. After the probe 114 detects and intercepts the copy 112, the probe 114 forwards the copy 112 to the mediation system 116, which transmits the copy 112 to a law enforcement agency ("LEA") system 118. An example of the mediation system 116 is the LAWFUL INTERCEPT NETWORK CONNECTOR ("LINC") from ETI CONNECT.

Upon receiving the copy 112, the mediation system 116 may then transmit the copy 112 to the LEA system 118 via the T1.IAS standard, packet capture and flat file export ("PCAP"), or other suitable packet capture standard in accordance with lawful interception. In order to verify the accuracy of the mediation system 116, a verification system 126 may be provided, which receives the test traffic 110 from the record module 124 and the copy 112 from the LEA system 118. In one embodiment, the verification system 126 compares the test traffic 110 and the copy 112 to verify that all of the data traffic transmitted between the user computer 102 and the network 108 is intercepted by the mediation system 116. In a further embodiment, the verification system 126 also determines the capture time by determining the difference between the time that the test traffic 110 originates from the user computer 102 and the time that the LEA system 118 receives the copy 112. Additional details regarding the operation of the testing system 100 is described in greater detail below with respect to FIG. 2.

Figure 2:
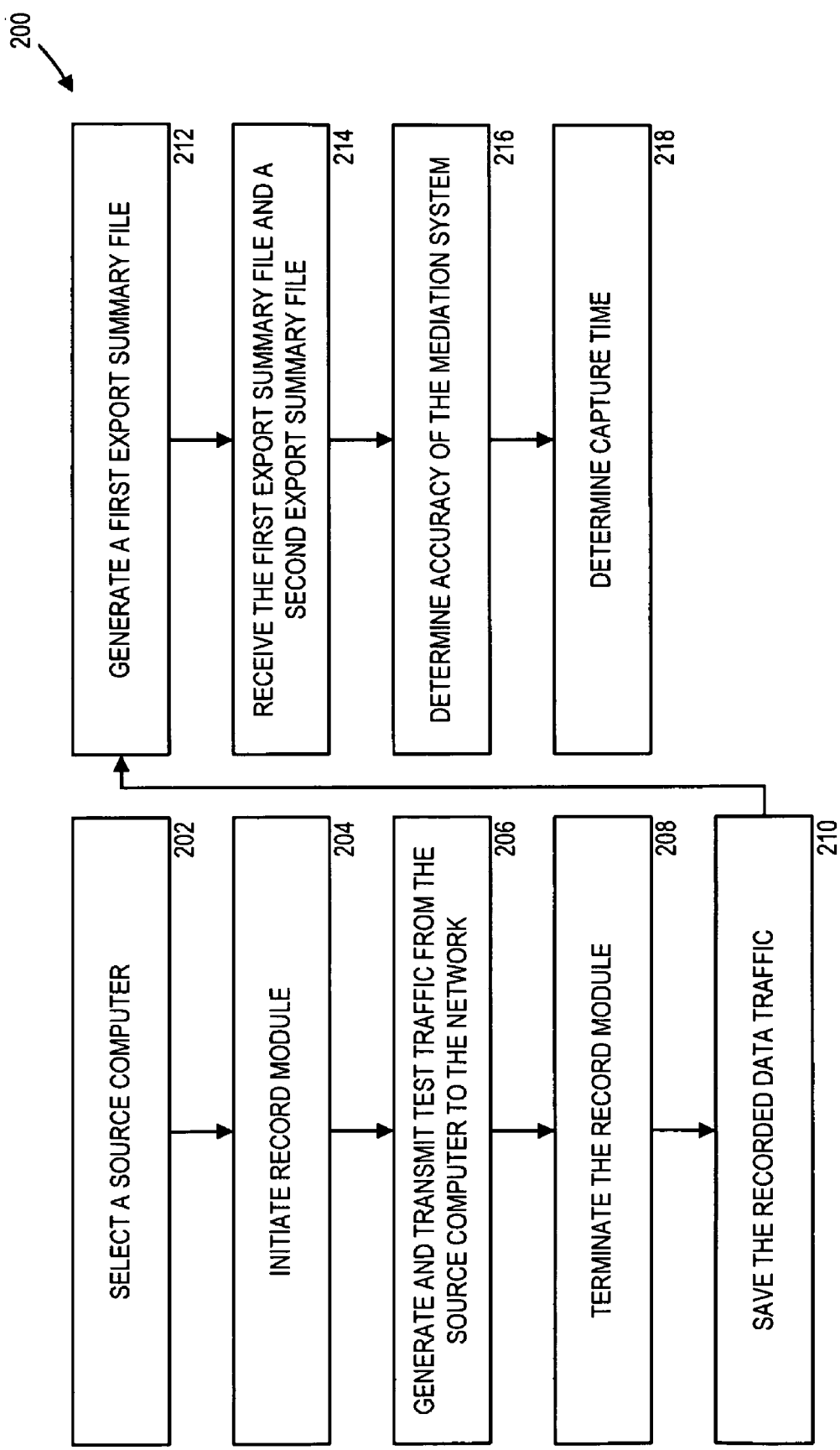
FIG. 2 is a flow diagram illustrating an illustrative test sequence implemented on the testing system of FIG. 1, in accordance with exemplary embodiments.

FIG. 2 is a flow diagram illustrating an exemplary test sequence 200 in which the test traffic 110 generated at the user computer 102 is intercepted by the mediation system 116. According to exemplary embodiments, the test sequence 200 determines whether the mediation system 116 intercepts all of the data traffic transmitted between the user computer 102 and the network 108. According to the test sequence 200, a source computer for generating the test traffic 110 is selected (at 202). In an illustrative example, the user computer 102 is selected as the source computer. As previously mentioned, the test traffic 110 may be manually generated or automatically generated via, for example, a suitable network traffic generator.

Upon selecting the user computer 102 as the source computer, the record module 124 is initiated (at 204) to record all data traffic, such as the test traffic 110, originating from the user computer 102 to the network 108. As previously mentioned, examples of the record module 124 may include ETHEREAL and WIRESHARK. In one embodiment, the NIC 130 is set to non-promiscuous mode when the record module 124 records the test traffic 110.

Upon configuring the record module 124 to record the test traffic 110, the test traffic 110 is generated at the user computer 102 and transmitted (at 206) to the network 108 via the BRAS 106. In the illustrative example, the user 104 generates the test traffic by performing multiple ping requests on a given IP address and performing a domain name server ("DNS") lookup. If the user computer 102 is running the WINDOWS operating system from MICROSOFT CORPORATION, for example, the following ping request may be executed at the command prompt: "ping-n 15 205.152.204.202." In this case, a ping request to the IP address of 205.152.204.202 (i.e., http://www.bellsouth.net) will be performed fifteen times. The ping request provides an explicit destination for the test traffic 110 that is verified by the receipt of a ping response. Further, if the user computer 102 is running the WINDOWS operating system from MICROSOFT CORPORATION, for example, the following DNS lookup request may be executed at the command prompt: "nslookup www.cisco.com." In this case, the uniform resource locator ("URL") of www.cisco.com is resolved to a particular IP address.

Figure 3:
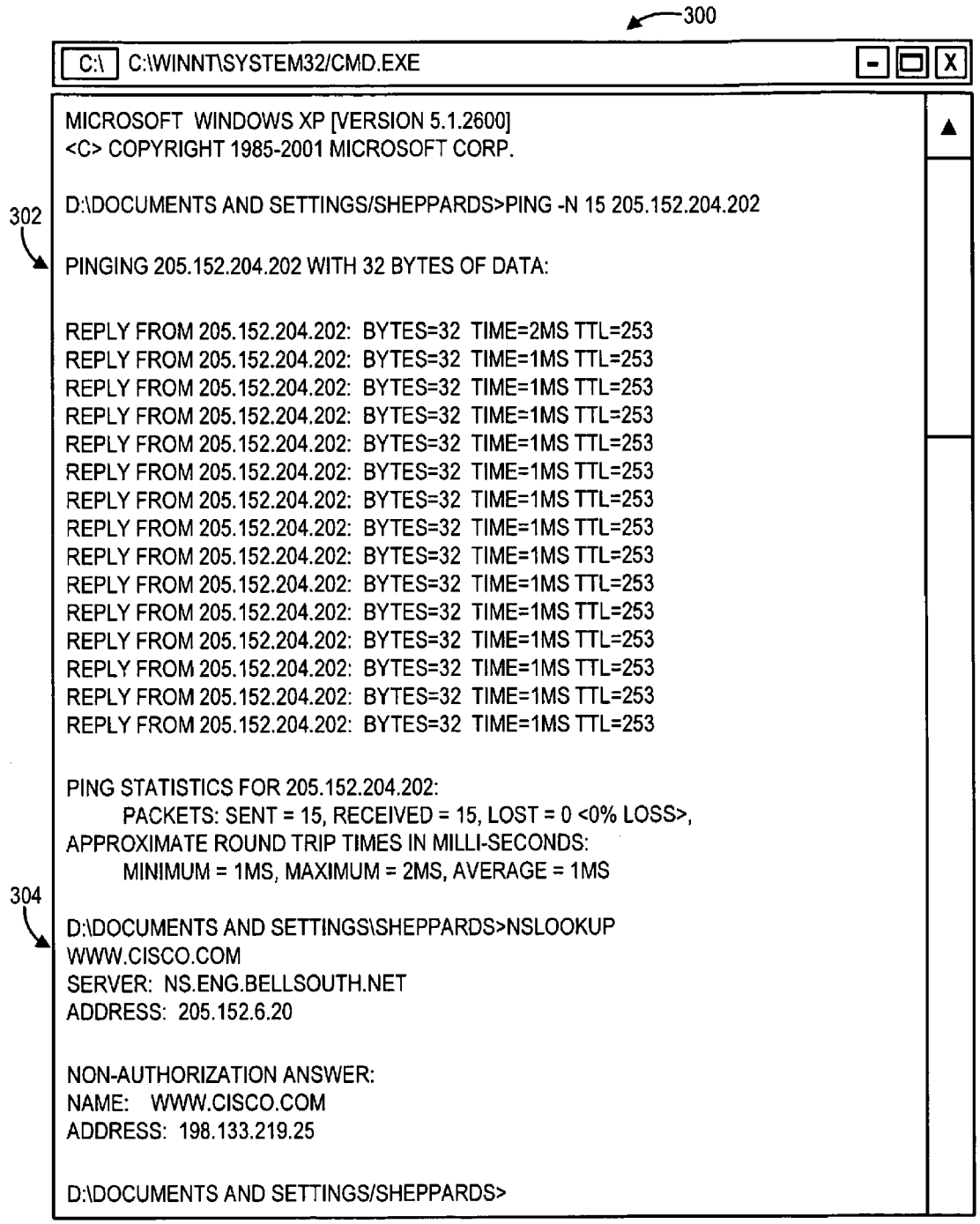
FIG. 3 is a screen display diagram illustrating an example of a ping request and name server lookup request, in accordance with exemplary embodiments.

FIG. 3 is an illustrative screen capture 300 showing an example of the above described ping request at 302 and the above described name server lookup request at 304. As illustrated in FIG. 3, the URL of www.cisco.com resolves to the IP address of 198.133.219.25. Referring again to FIG. 2, once the test traffic 110 has been generated and transmitted, the record module 124 is terminated (at 208).

Figure 4:
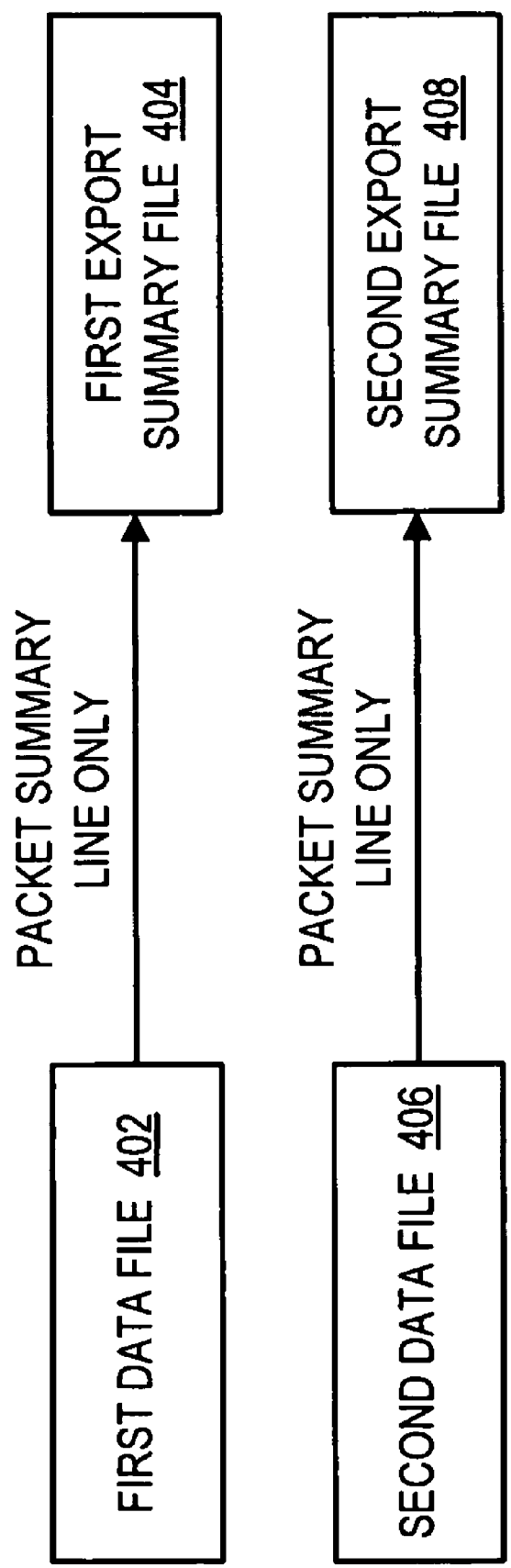
FIG. 4 is simplified block diagram illustrating a creation of export summary files, in accordance with exemplary embodiments.

Referring again to FIG. 2, the user computer 102 saves (at 210) the test traffic 110 in a data file, such as a first data file 402, as illustrated in FIG. 4. The first data file 402 may be saved in PCAP format, and may be named under any suitable file name convention as contemplated by those skilled in the art. In one example, the first data file 402 may be PC+month+day+year+time of the test. Thus, if the test traffic 110 is recorded by the record module 124 on May 3, 2007 at 8:33 am, the first data file 402 may be named as PC0503070833.PCAP, where "05" refers to May, "03" refers to the day, "07" refers to the year, "0833" refers to the time of the test.

Figure 5:
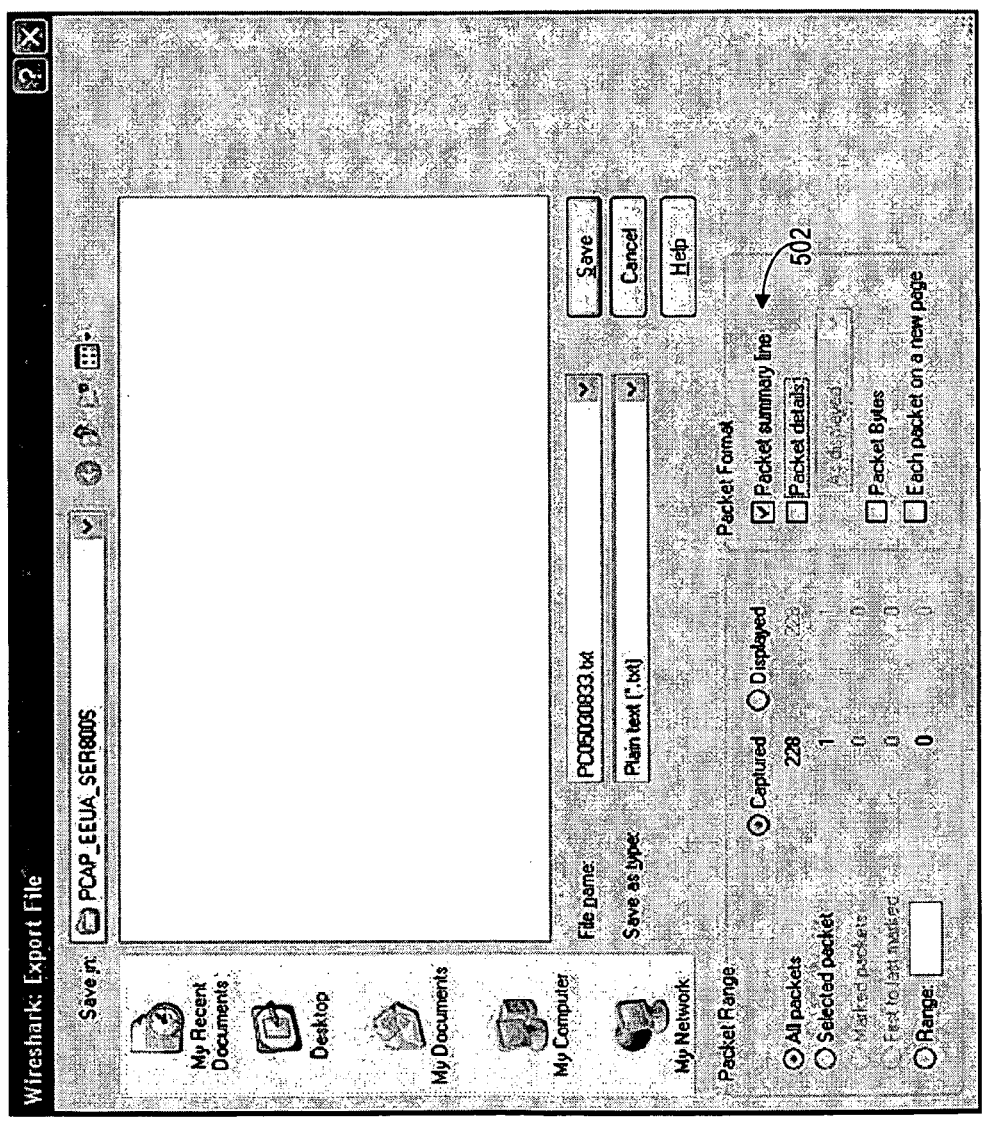
FIG. 5 is a screen display diagram illustrating an operation of the record module, in accordance with exemplary embodiments.

In one embodiment, an export summary file, such as a first export summary file 404, is generated (at 212) based on the first data file 402. In an illustrative example, WIRESHARK provides a graphical user interface ("GUI") 500, as illustrated in FIG. 5, to create the first export summary file 404. In one embodiment, the export summary file 404 is a packet summary line only file, which is an option available on WIRESHARK at 502. The information provided in the first export summary file 404 is the same information that should be provided by the mediation system 116 to the LEA system 118 after data capture and processing.

As previously mentioned, the test traffic 110 also passes through the BRAS 106. As the test traffic 110 passes through the BRAS 106, the BRAS 106 makes the copy 112 of the test traffic 110. The probe 114 intercepts the copy 112 and forwards the copy 112 to the mediation system 116. The mediation system 116 may save the copy 112 in a second data file 406, which may also be in PCAP format like the first data file 402. According to exemplary embodiments, the second data file 406 may be exported from the mediation system 116 to the LEA system 118. At the LEA system 118, a second export summary file 408 may also be generated based on the second data file 406. The second export summary file 408 may also be a packet summary line only file.

In one embodiment, the first export summary file 404 and the second export summary file 408 each contain a source IP address of the source computer from which each data frame in the captured data traffic originates, a destination IP address of the destination computer to which the data frame is transmitted, protocol information regarding the data frame, and a timestamp identifying when the data frame was intercepted. In some instances, the source IP address listed in the first export summary file 404 is different from the source IP address listed in the second export summary file 408. One reason for the difference is that the probe 114 may receive a public IP address associated with the modem 132 instead of a private IP address associated with the source computer that the record module 124 may receive. In particular, the private IP address may be mapped to the public IP via network address translation ("NAT"). Thus, in one embodiment, in order to compare the source IP addresses in the first export summary file 404 with the source IP addresses in the second export summary file 408, the source IP addresses in the second export summary file 408 may be changed from the public IP address intercepted by the probe 114 to the private IP address associated with the user computer 102.

It should be appreciated that the first export summary file 404 and the second export summary file 408 may contain additional data, such as data specific to the connection between the modem 132 and the BRAS 106. Such data may include keep-alive protocol related data, network time protocol ("NTP") related data, and other unrelated data traffic. Such data may be removed from the first export summary file 404 and the second export summary file 408. For the sake of simplicity, this additional data is ignored in the embodiments described herein.

Referring again to FIG. 2, the verification system 126 receives (at 214) the first export summary file 404 from the user computer 102 and the second export summary file 408 from the LEA system 118. The verification system 126 compares the first export summary file 404 and the second export summary file 408 to determine (at 216) whether all of the data traffic originating from the user computer 102 was captured by the mediation system 116. In one embodiment, the verification system 126 compares the first export summary file 404 and the second export summary file 408 by importing the first export summary file 404 and the second export summary file 408 into a spreadsheet application, such as EXCEL from MICROSOFT CORPORATION. In particular, if the number of intercepted data frames for a given source IP address and destination IP address pair included in the first export summary file 404 matches the number of intercepted data frames for the same source IP address and destination IP address pair included in the second export summary file 408, then the mediation system 116 is likely intercepting all of the data traffic at the BRAS 106. However, if the number of intercepted data frames in the first export summary file 404 does not match the number of intercepted data frames in the second export summary file 408 for the given source IP address and destination IP address pair, then the mediation system 116 is likely not intercepting all of the data traffic at the BRAS 106.

The verification system 126 further compares the first export summary file 404 and the second export summary file 408 to determine (at 218) the capture time utilized to intercept the data frames and store the data frames on the mediation system 116. In one embodiment, the verification system 126 utilizes the spreadsheet application to determine a difference between the timestamp associated with a given data frame included in the first export summary file 404 and the timestamp associated with the same data frame included in the second export summary file 408. If the time difference between the timestamp included in the first export summary file 404 and the timestamp included in the second export summary file 408 is below a given threshold, then the mediation system 116 is timely intercepting the data traffic at the BRAS 106. However, if the time difference between the timestamp included in the first export summary file 404 and the time included in the second export summary file 408 is above the given threshold, then the mediation system 116 is not timely intercepting the data traffic at the BRAS 106. In other embodiments, more than one export summary file may be compared as contemplated by those skilled in the art.

Figure 6:
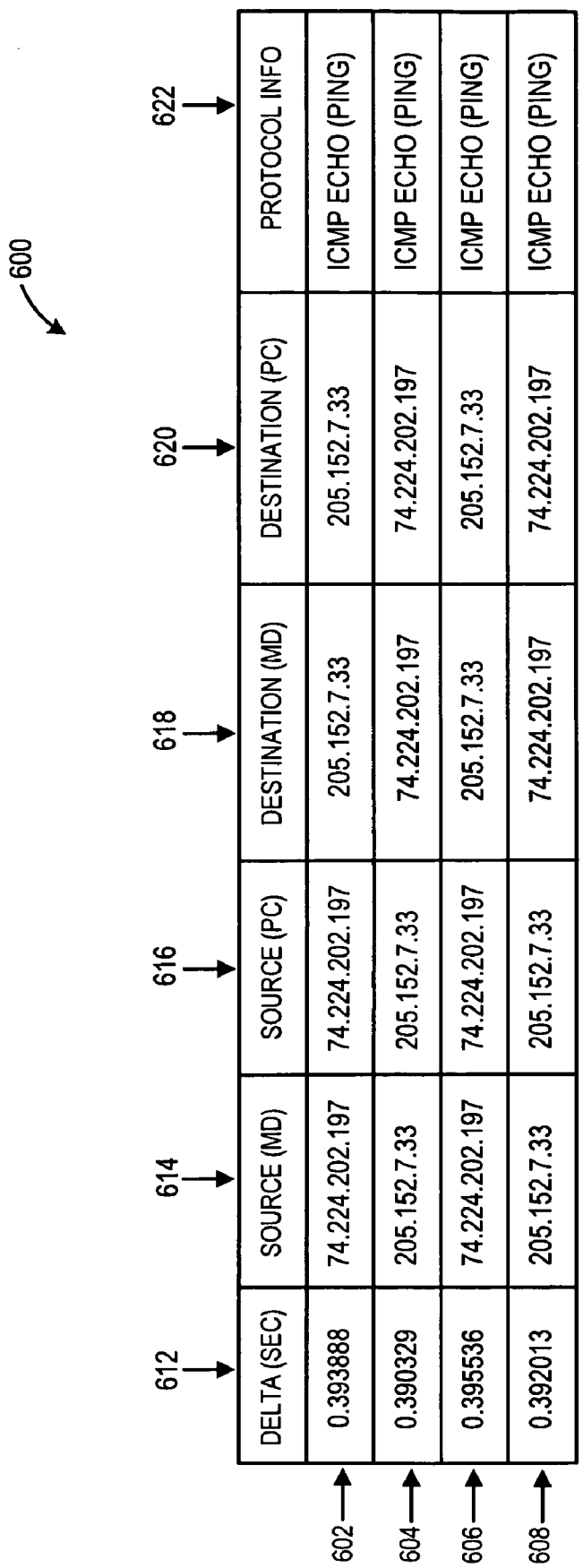
FIG. 6 is a diagram illustrating a comparison between the first export summary file and the second export summary file, in accordance with exemplary embodiments.

Referring now to FIG. 6, a diagram 600 illustrating a comparison between the first export summary file 404 and the second export summary file 408 is shown. More specifically, in the diagram 600, the data frames recorded by the record module 124 and intercepted by the probe 114 were generated by a ping request to the destination IP address 205.152.7.33 from the source IP address 74.224.202.197 of the user computer 102. The diagram 600 includes four rows 602, 604, 606, 608, each of which is associated with a different intercepted data frame.

The diagram 600 further includes six columns 612, 614, 616, 618, 620, 622. The first column 612 shows a delta time (i.e., the difference between the time a given data frame is recorded by the record module 124 and the time the given data frame is intercepted by the probe 114) in seconds. The second column 614 shows the source IP address of the given data frame captured by the mediation system 116. The third column 616 shows the source IP address of the given data frame captured by the user computer 102. The fourth column 618 shows the destination IP address of the given data frame captured by the mediation system 116. The fifth column 620 shows the destination IP address of the given data frame captured by the user computer 102. The sixth column 622 shows the protocol information related to the given data frame. As illustrated in FIG. 6, the sixth column 622 indicates an Internet control message protocol ("IMCP") ping. In view of the IP addresses in the second, third, fourth, and fifth columns 614, 616, 618, 620, the first row 602 and the third row 606 are associated with a ping request from the user computer 102 to the destination IP address of 205.152.7.33, and the second row 604 and fourth row 608 are associated with a ping response from the destination IP address 205.152.7.33 to the user computer 102.

Figure 7:
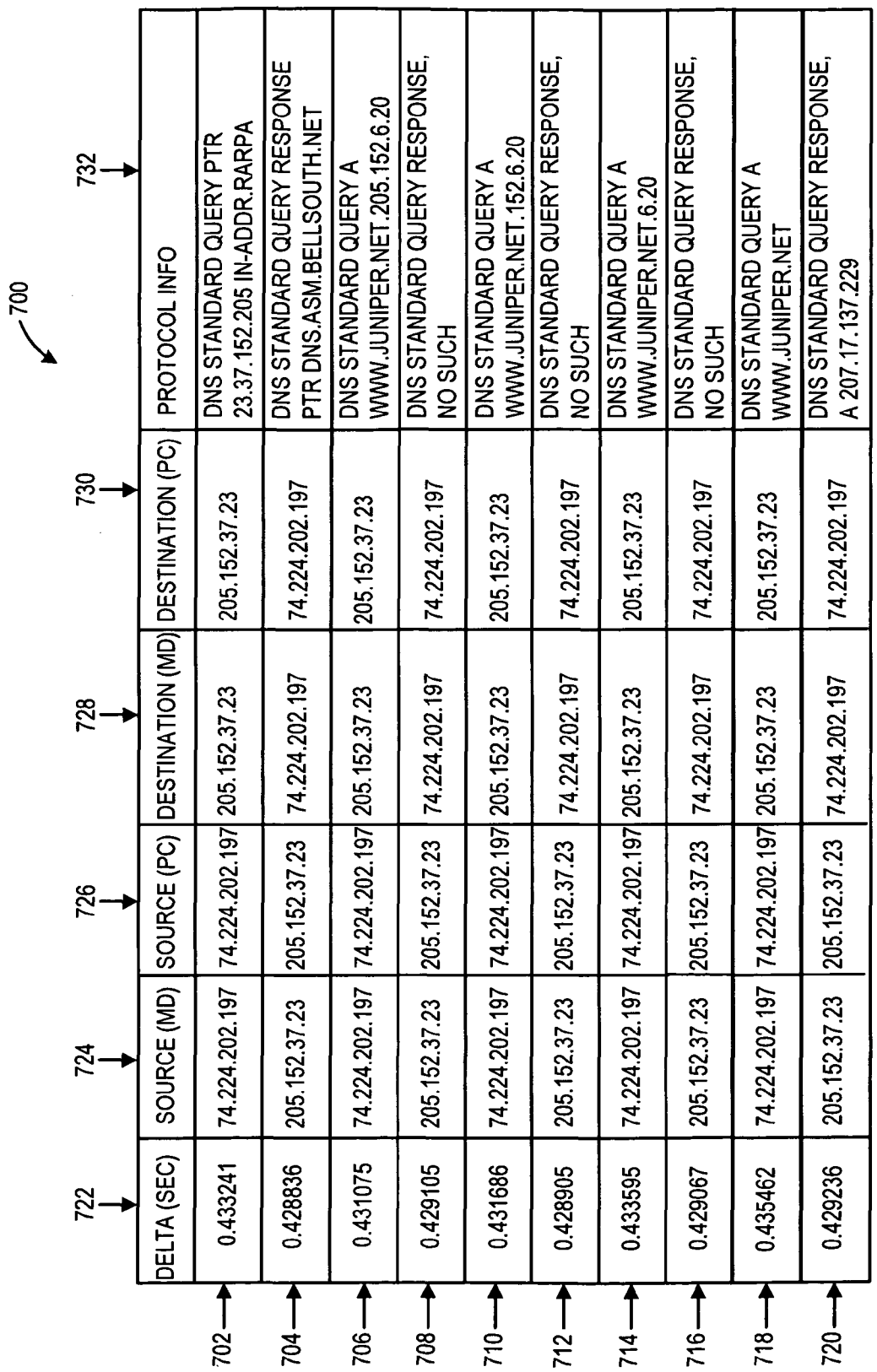
FIG. 7 is another diagram illustrating a comparison between the first export summary file and the second export summary file, in accordance with exemplary embodiments.

Referring now to FIG. 7, a diagram 700 illustrating a comparison between the information contained in the first export summary file 404 related to the data frames recorded by the record module 124 and the information contained in the second export summary file 408 related to the data frames intercepted by the probe 114 is shown. More specifically, in the diagram 700, the data frames recorded by the record module 124 and intercepted by the probe 114 were generated by a DNS lookup of the URL www.juniper.net from the source IP address 74.224.202.197 of the user computer 102. The diagram 700 includes ten rows 702, 704, 706, 708, 710, 712, 714, 716, 718, 720 each of which is associated with a different intercepted data frame.

The diagram 700 further includes six columns 722, 724, 726, 728, 730, 732 similar to the six columns 612, 614, 616, 618, 620, 622 shown in the diagram 600. The first column 722 shows a delta time (i.e., the difference between the time a given data frame is recorded by the record module 124 and the time the given data frame is intercepted by the probe 114 and stored in the mediation system 116) in seconds. The second column 724 shows the source IP address of the given data frame captured by the mediation system 116. The third column 726 shows the source IP address of the given data frame captured by the user computer 102. The fourth column 728 shows the destination IP address of the given data frame captured by the mediation system 116. The fifth column 730 shows the destination IP address of the given data frame captured by the user computer 102. The sixth column 732 shows the protocol information related to the given data frame. As illustrated in FIG. 7, the sixth column 732 indicates different DNS queries and DNS query responses associated with the DNS lookup of the URL www.juniper.net. In view of the protocol information in the sixth column 732, the first, third, fifth, seventh and ninth rows 702, 706, 710, 714, 718 are associated with a given DNS query, and the second, fourth, sixth, eight, and tenth rows 704, 708, 712, 716, 720 are associated with a DNS query response associated with a respective DNS query.

Figure 8:
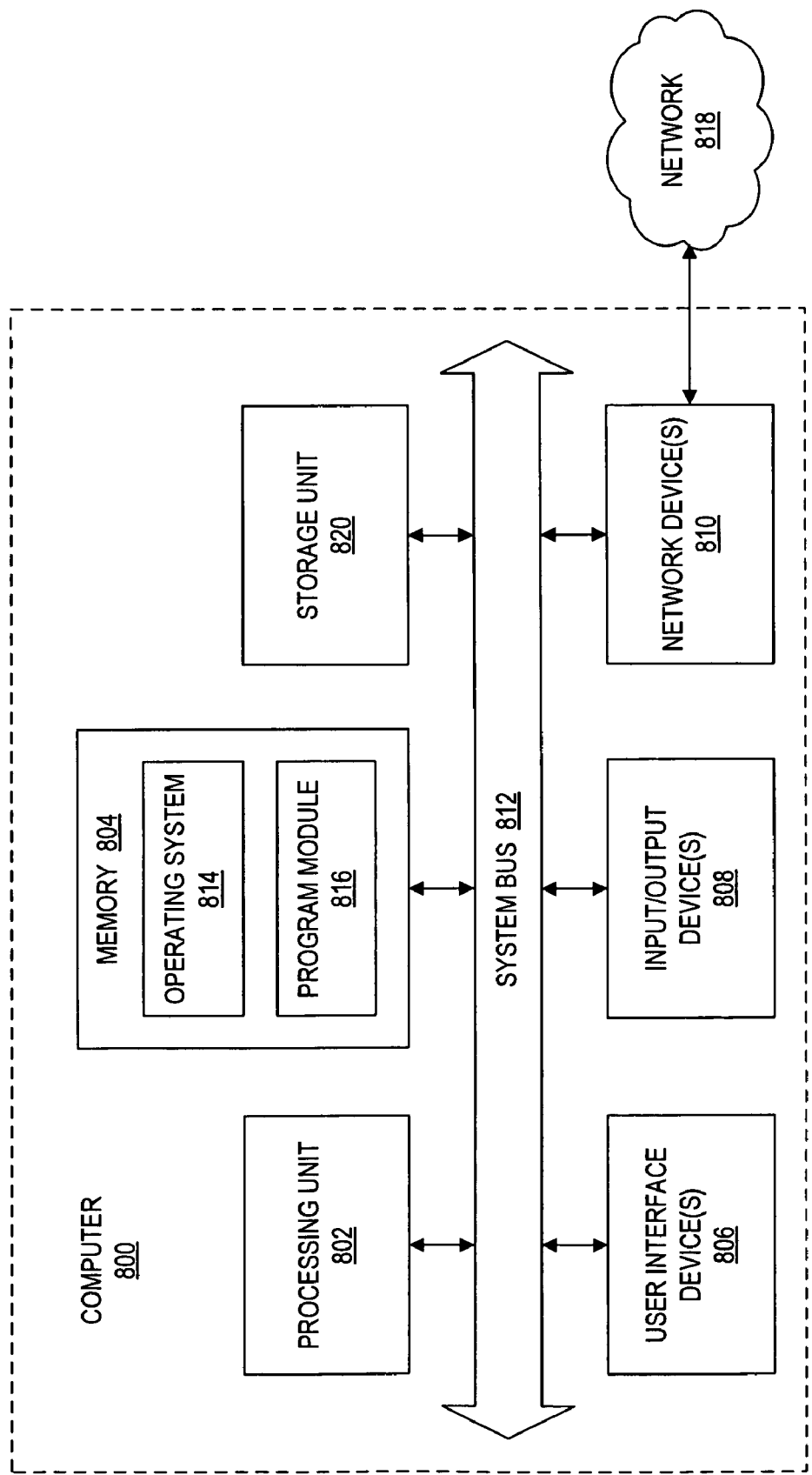
FIG. 8 is a simplified block diagram illustrating a system configured to verify a lawful interception system, in accordance with exemplary embodiments.

FIG. 8 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 8 is a block diagram illustrating a computer 800, in accordance with exemplary embodiments. Examples of the computer 800 may include the user computer 102, the verification system 126, the mediation system 116, and the LEA system 118. The computer 800 includes a processing unit 802, a memory 804, one or more user interface devices 806, one or more input/output ("I/O") devices 808, one or more network devices 810, and the storage unit 820, each of which is operatively connected to a system bus 812. The bus 812 enables bi-directional communication between the processing unit 802, the memory 804, the user interface devices 806, the I/O devices 808, the network devices 810, and the storage unit 820.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 804 communicates with the processing unit 802 via the system bus 812. In one embodiment, the memory 804 is operatively connected to a memory controller (not shown) that enables communication with the processing unit 802 via the system bus 812. The memory 804 includes an operating system 814 and at least one program module 816, according to exemplary embodiments. Examples of operating systems, such as the operating system 814, include, but are not limited to, WINDOWS operating system from MICROSOFT CORPORATION, LINUX operating system, MAC OS from APPLE CORPORATION, and FREEBSD operating system. Examples of the program module 816 include the record module 124 and the verification system 126. In one embodiment, the program module 816 is embodied in computer-readable media containing instructions that, when executed by the processing unit 802, performs a method for verifying a lawful interception system, as described in greater detail above. According to further embodiments, the program module 816 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 800.

The user interface devices 806 may include one or more devices with which a user accesses the computer 800. The user interface devices 806 may include, but are not limited to, computers, servers, personal digital assistants, cellular phones, or any suitable computing devices. The I/O devices 808 enable a user to interface with the program module 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer 800 to communicate with other networks or remote systems via a network 818. Examples of the network devices 810 may include, but are not limited to, a modem (e.g., an ATUR), a radio frequency ("RF") or infrared ("IR") transceiver, a telephonic interface, a bridge, a router, or a network card. The network 818 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 818 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN"). An example of the network 818 is the network 108.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for verifying a lawful interception system, comprising:

generating, at a computer, data traffic by performing multiple ping requests on an Internet Protocol address and receiving a corresponding echo reply in response to performing each of the multiple ping requests;

recording, at the computer, the data traffic as the computer generates the data traffic;

upon recording the data traffic at the computer, saving, at the computer, the data traffic as a first packet capture and flat file export file, the first packet capture and flat file export file comprising a first source Internet Protocol address of a source computer from which each data frame in the data traffic originates, a first destination Internet protocol address of a destination computer to which the each data frame is transmitted, first protocol information regarding the each data frame, and a first timestamp identifying when the each data frame was recorded;

generating, at the computer, a first export summary file comprising first packet summary lines from the first packet capture and flat file export file;

transmitting, from the computer to a verification system, the first export summary file;

transmitting a copy of the data traffic from the computer to a remote network via a broadband remote access server;

upon transmitting the copy of the data traffic from the computer to the remote network via the broadband access server, intercepting, via a probe, the copy of the data traffic as the copy of the data traffic egresses from a mediation system to a law enforcement agency system;

upon intercepting the copy of the data traffic as the data traffic egresses from the mediation system to the law enforcement agency system, saving, at the law enforcement agency system, the copy of the data traffic as a second packet capture and flat file export file, the second packet capture and flat file export file comprising a second source Internet Protocol address of the source computer from which the each data frame in the data traffic originates, a second destination Internet protocol address of the destination computer to which the each data frame is transmitted, second protocol information regarding the each data frame, and a second timestamp identifying when the each data frame was recorded;

generating, at the law enforcement agency system, a second export summary file comprising second packet summary lines from the second packet capture and flat file export file;

transmitting, from the LEA system to the verification system, the second export summary file; and comparing, at the verification system, the first export summary file with the second export summary file to verify an accuracy of the mediation system.

2. The method of claim 1, wherein comparing, at the verification system, the first export summary file with the second export summary file to verify an accuracy of the mediation system comprises:

importing, at the verification system, the first export summary file and the second export summary file into a spreadsheet application; and determining, at the verification system, whether data frames in the data traffic recorded by the computer are equivalent to data frames in the data traffic captured by the mediation system by comparing the first export summary file and the second export summary file via the spreadsheet application.

3. The method of claim 1, wherein comparing, at the verification system, the first export summary file with the second export summary file to verify an accuracy of the mediation system comprises:

importing, at the verification system, the first export summary file and the second export summary file into a spreadsheet application; and determining, at the verification system, a difference between a time at which each data frame in the data traffic is recorded by the computer and a time at which each data frame in the data traffic is captured by the mediation system via the spreadsheet application.

4. The method of claim 1, wherein the data traffic is further generated at the computer by generating a domain name server lookup to a uniform resource locator.

5. A system for verifying a lawful interception system, comprising:

a computer having a processor and a memory, the computer configured to:

generate data traffic by performing multiple ping requests on an Internet Protocol address and receiving a corresponding echo reply in response to performing each of the multiple ping requests, recording the data traffic as the computer generates the data traffic, upon recording the data traffic at the computer, saving the data traffic as a first packet capture and flat file export file, the first packet capture and flat file export file comprising a first source Internet Protocol address of the source computer from which the each data frame in the data traffic originates, a first destination Internet protocol address of the destination computer to which the each data frame is transmitted, first protocol information regarding the each data frame, and a first timestamp identifying when the each data frame was recorded, generate a first export summary file comprising first packet summary lines from the first packet capture and flat file export file, transmit, to a verification system, the first export summary file, and transmitting a copy of the data traffic to a remote network via a broadband remote access server;

a probe configured to intercept the copy of the data traffic as the copy of the data traffic egresses from a mediation system to a law enforcement agency system;

the law enforcement agency system configured to:

receive the copy of the data traffic intercepted by the probe;

save the copy of the data traffic as a second packet capture and flat file export file, the second packet capture and flat file export file comprising a second source Internet Protocol address of a source computer from which each data frame in the data traffic originates, a second destination Internet protocol address of a destination computer to which the each data frame is transmitted, second protocol information regarding the each data frame, and a second timestamp identifying when the each data frame was recorded, generate a second export summary file comprising second packet summary lines from the second packet capture and flat file export file, and transmit, to the verification system, the second export summary file; and the verification system configured to compare the first export summary file with the second export summary file to verify an accuracy of the mediation system.

6. The system of claim 5, wherein to compare the first export summary file with the second export summary file to verify an accuracy of the mediation system, the verification system is further configured to:

import the first export summary file and the second export summary file into a spreadsheet application, and determine whether data frames in the data traffic recorded by the computer are equivalent to data frames in the data traffic captured by the mediation system by comparing the first export summary file and the second export summary file via the spreadsheet application.

7. The system of claim 5, wherein to compare the first export summary file with the second export summary file to verify an accuracy of the mediation system, the verification system is further configured to:

import the first export summary file and the second export summary file into a spreadsheet application, and determine a difference between a time at which each data frame in the data traffic is recorded by the computer and a time at which each data frame in the data traffic is captured by the mediation system via the spreadsheet application.

8. The system of claim 5, wherein the data traffic is further generated at the computer by generating a domain name server lookup to a uniform resource locator.

9. A non-transitory computer-readable medium having instructions stored thereon for execution by a processor to provide a method for verifying a lawful interception system, the method comprising:

generating, at a computer, data traffic by performing multiple ping requests on an Internet Protocol address and receiving a corresponding echo reply in response to performing each of the multiple ping requests;

recording, at the computer, the data traffic as the computer generates the data traffic;

upon recording the data traffic at the computer, saving, at the computer, the data traffic as a first packet capture and flat file export file, the first packet capture and flat file export file comprising a first source Internet Protocol address of the source computer from which the each data frame in the data traffic originates, a first destination Internet protocol address of the destination computer to which the each data frame is transmitted, first protocol information regarding the each data frame, and a first timestamp identifying when the each data frame was recorded;

generating, at the computer, a first export summary file comprising first packet summary lines from the first packet capture and flat file export file;

transmitting, from the computer to a verification system, the first export summary file;

transmitting a copy of the data traffic from the computer to a remote network via a broadband remote access server;

upon transmitting the copy of the data traffic from the computer to the remote network via the broadband access server, intercepting, via a probe, the copy of the data traffic as the copy of the data traffic egresses from a mediation system to a law enforcement agency system;

upon intercepting the copy of the data traffic as the data traffic egresses from the mediation system to the law enforcement agency system, saving, at the law enforcement agency system, the copy of the data traffic as a second packet capture and flat file export file, the second packet capture and flat file export file comprising a second source Internet Protocol address of a source computer from which each data frame in the data traffic originates, a second destination Internet protocol address of a destination computer to which the each data frame is transmitted, second protocol information regarding the each data frame, and a second timestamp identifying when the each data frame was recorded;

generating, at the law enforcement agency system, a second export summary file comprising second packet summary lines from the second packet capture and flat file export file;

transmitting, from the LEA system to the verification system, the second export summary file; and comparing, at the verification system, the first export summary file with the second export summary file to verify an accuracy of the mediation system.

10. The non-transitory computer-readable of claim 9, wherein comparing, at the verification system, the first export summary file with the second export summary file to verify an accuracy of the mediation system comprises:

importing, at the verification system, the first export summary file and the second export summary file into a spreadsheet application; and determining, at the verification system, whether data frames in the data traffic recorded by the computer are equivalent to data frames in the data traffic captured by the mediation system by comparing the first export summary file and the second export summary file via the spreadsheet application.

11. The non-transitory computer-readable of claim 9, wherein comparing, at the verification system, the first export summary file with the second export summary file to verify an accuracy of the mediation system comprises:

importing, at the verification system, the first export summary file and the second export summary file into a spreadsheet application; and determining, at the verification system, a difference between a time at which each data frame in the data traffic is recorded by the computer and a time at which each data frame in the data traffic is captured by the mediation system via the spreadsheet application.

12. The non-transitory computer-readable of claim 9, wherein the data traffic is further generated at the computer by generating a domain name server lookup to a uniform resource locator.

* * * * *

UNITED STATES PATENT AND TRADEMARK OFFICE
CERTIFICATE OF CORRECTION

PATENT NO. : 7,975,046 B2  Page 1 of 1
APPLICATION NO. : 12/062206
DATED : July 5, 2011
INVENTOR(S) : Scott Sheppard It is certified that error appears in the above-identified patent and that said Letters Patent is hereby corrected as shown below:

Cover Page, item (73) Assignee: the portion reading "LLP" should be changed to --LP--
and should read AT&T Intellectual Property I, LP Signed and Sealed this
Ninth Day of August, 2011

David J. Kappos
*Director of the United States Patent and Trademark Office*